United States Patent [19]

Yamamoto

[11] Patent Number: 4,471,230
[45] Date of Patent: Sep. 11, 1984

[54] CONTROL DEVICE FOR SWITCHES FITTED ONTO AN AUTOMOBILE STEERING WHEEL

[75] Inventor: Tsutomu Yamamoto, Toride, Japan
[73] Assignee: Niles Parts Co., Ltd., Tokyo, Japan
[21] Appl. No.: 472,087
[22] Filed: Mar. 4, 1983
[51] Int. Cl.³ .......................... H02G 3/00; H01H 9/00
[52] U.S. Cl. .................................. 307/10 R; 307/115; 307/117; 307/140
[58] Field of Search ............... 307/9, 10 R, 32 C, 115, 307/117, 140

[56] References Cited

U.S. PATENT DOCUMENTS 3,864,578  2/1975  Lackey .......................... 307/10 R
4,368,393  1/1983  Izawa et al. ........................ 307/115

FOREIGN PATENT DOCUMENTS 57-143745  9/1982  Japan .

*Primary Examiner*—Joseph W. Hartary
*Assistant Examiner*—Derek Jennings
*Attorney, Agent, or Firm*—Lane, Aitken & Kananen

[57] ABSTRACT

A novel control device for switches fitted onto an automobile steering wheel including a rotary sensor and a rotation discriminating circuit to detect the turning angle of the steering wheel when changing the running direction of the automobile to the right or left and prevent the load of the switch from being actuated even when another switch fitted onto the center of the steering wheel is maloperated while operating a turn signal lamp.

This control device makes the turning operation of the steering wheel easier and at the same time, it can contribute to the safe driving of the automobiles.

Furthermore, the device can be constructed with simple parts and mounted readily on the existing automobiles.

6 Claims, 8 Drawing Figures

CONTROL DEVICE FOR SWITCHES FITTED ONTO AN AUTOMOBILE STEERING WHEEL

BACKGROUND OF THE INVENTION

The present invention relates to a maloperation preventive device for various control switches attached to the steering wheel of a vehicle and more particularly an automobile.

These days, there are a variety of car switches available for ensuring safe driving and a large number of switches have been attached to a vehicle.

Such construction has been developed that these control switches are fitted onto the upper face portion of the steering wheel wherever possible taking account of the operability for the safe driving of the automobiles. When all is said, it has been so constructed as to enable handling these switches easily as desired while operating the steering wheel.

However, the abovementioned construction has encountered difficulties that although various control switches have been fitted to the upper face of the steering wheel to assure easier operation of these switches as discussed above, on the other hand, when turning the steering wheel to change the running direction of the automobile, there is a possibility of a hand coming in touch with the switch(es) by some chance and as a result, maloperation is caused. Such construction has further presented a possibility of the safety in driving being jeopardized due to unstable operation of the steering wheel.

The present invention has been made to overcome the disadvantages described above and can provide a control device for various switches fitted onto the automobile steering wheel, featuring that even if a hand or a part of an arm touches the actuating portion of any switch accidentally while operating the steering wheel, that is to say, while manipulating the steering wheel in excess of a specified turning angle, an electric circuit to a load connected to said switch is not closed, thus precluding the possibility of the switch working erroneously and also preventing a proper operation of the steering wheel from being disturbed.

SUMMARY OF THE INVENTION

The present invention pertains to the improvement in the control device for the switches attached to the automobile steering wheel.

To change the running direction of the automobile, generally, the steering wheel may be turned clockwise or counter-clockwise while a turn signal switch is operated. By flashing a rear turn signal lamp fitted to the automobile, the drivers of the succeeding cars are apprised of the turning direction.

If the driver then operates erroneously a control switch attached to the center of the steering wheel, the output signal of the control switch is fed into a discriminating circuit and transmitted to a load through a decoder circuit. And, the load, e.g., a powered window motor, operates.

The improvement by the present invention helps to atone for the above-discussed shortcomings inherent in the prior art device and an object of the present invention is to provide a novel control device for the switches fitted onto the automobile steering wheel, which device includes a rotary sensor working to detect the clockwise or counter-clockwise turning angle of the steering wheel and also working not to break an output signal so long as the turning angle of the steering wheel is within that specified. Thus, the device restrains the corresponding load from being actuated even though the control switch is operated by mistake, while operating the steering wheel clockwise or counter-clockwise, for securing the safe driving of the automobile. It is another object of the present invention to provide a control device for the switches fitted onto the automobile steering wheel characterized in that a photocoupler and the rotary sensor are combined as a detecting means for the turning angle of the steering wheel. Such a device can be embodied on a vehicle with a simple construction.

It is more specific object of the present invention to provide a control device for the switches attached to the automobile steering wheel characterized in that the rotary sensor substantially comprises a plane rotary base including a sliding resistor fitted in a guide slot formed spirally with the steering wheel shaft in the center at the bottom portion of the steering wheel.

The above and other objects and novel features of the present invention will be apparent in the following detailed description of illustrative embodiments thereof which is to be read in connection with the accompanying drawings. Of significance in particular for understanding is that the appended drawings are available for describing the present invention but not for limiting the invention.

DETAILED DESCRIPTION OF THE PREFERRED EMBODIMENTS

Figure 1:
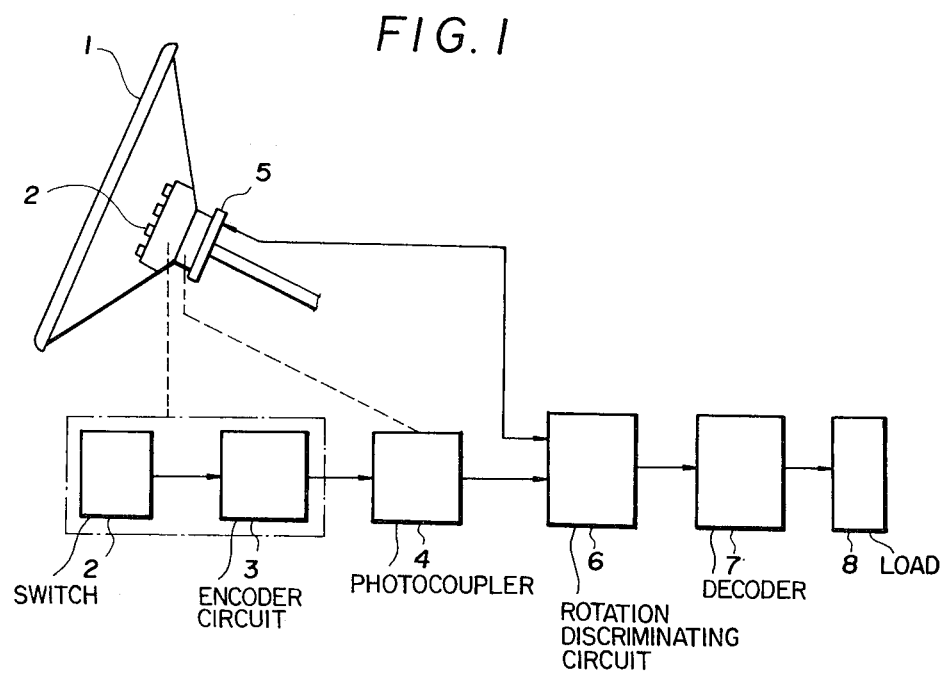
FIG. 1 is a system diagram showing a block diagram of the components of a control device for the switches attached to the automobile steering wheel, according to the present invention.
Figure 2:
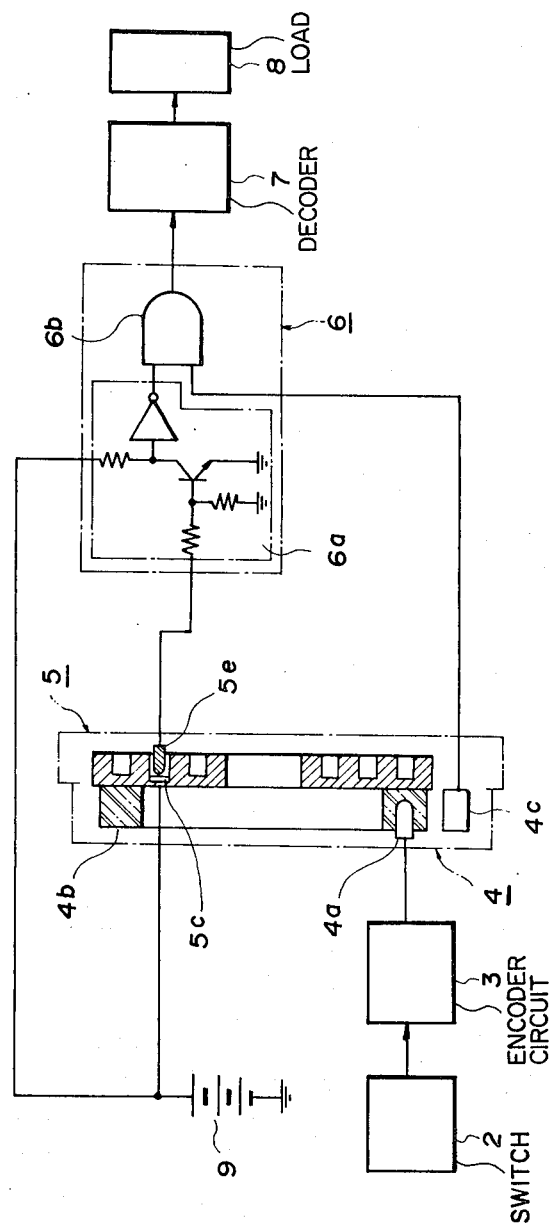
FIG. 2 is a detailed block diagram showing a first embodiment of the photocoupler, the rotary sensor and the rotation discriminating circuit in FIG. 1.
Figure 3:
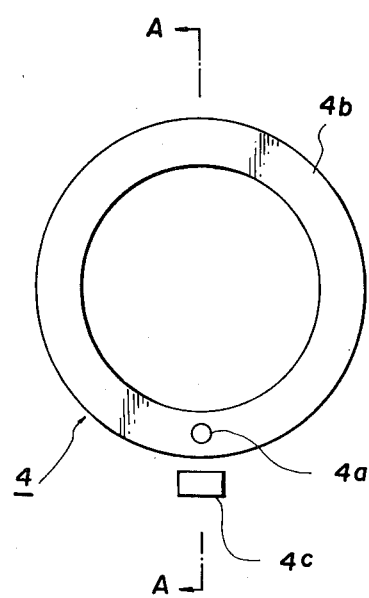
FIG. 3 is a plan view of the photocoupler in FIG. 1.
Figure 4:
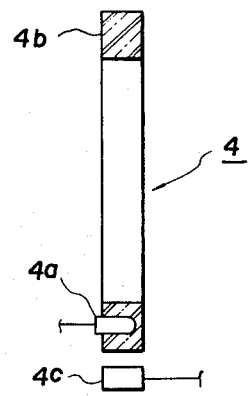
FIG. 4 is a cross-sectional view taken on line A—A in FIG. 3.
Figure 5:
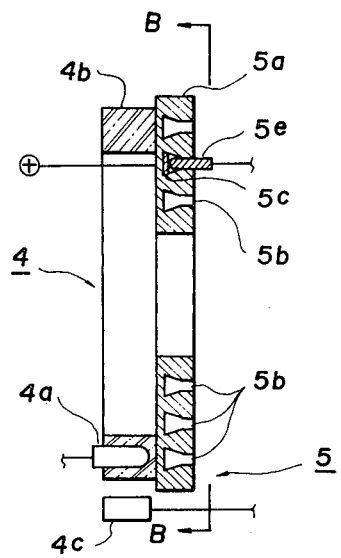
FIG. 5 is a cross-sectional view showing a second embodiment of the photocoupler and the rotary sensor in FIG. 1.

FIG. 1 is a system block diagram showing a preferred embodiment of the control device for the switches attached to the automobile steering wheel of the present invention. Referring now to FIG. 1, FIG. 2, FIG. 3, FIG. 4, FIG. 5, FIG. 6, FIG. 7 and FIG. 8, there is given a detailed description of the construction of the embodiment. Reference numeral 1 is a steering wheel of an automobile. Numeral 2 is a plurality of control switches which are attached to the center of the steering wheel 1 and the periphery thereof. Numeral 3 is an encoder circuit which converts the respective actions of the control switches 2 to the respective encoding signals to output a serial output signal, and this circuit is incorporated inside at the center of said steering wheel 1. Reference numeral 4 denotes a photocoupler. The photocoupler 4 operates to further convert the serial output signal converted to the encoding signals by means of the encoder circuit 3 to a photosignal. The photocoupler 4, as shown in FIG. 3 and FIG. 4, consists of a photoconductor 4b made of a photoconductive material and made in a ringed form, a light-emitting element 4a embedded in a specified position at the upper face of the photoconductor 4b and a light-receiving element 4c arranged at the outer periphery of the photoconductor 4b. The ringed photoconductor 4b is secured to the circumferential portion at the shaft center of the central portion of the aforesaid steering wheel 1 to allow the photoconductor to rotate together with the steering wheel. The light-emitting element 4a embedded in the specified position at the upper face receives the serial output signal from the encoder circuit 3 to further convert to a photosignal. Also, the light-receiving element 4c detects the photosignal sent from the light-emitting element 4a through the photoconductor 4b to input the serial output signal to a gate circuit 6b (shown in FIG. 2) of a rotation discriminating circuit 6 at the next stage. Reference numeral 5 denotes a rotary sensor. The rotary sensor 5, for example, comprises a rotary base 5a and a contact needle 5e maintaining a sliding contact with a spiral resistor formed in the rotary base 5a as shown by the embodiment in FIG. 5 and FIG. 6.

Figure 6:
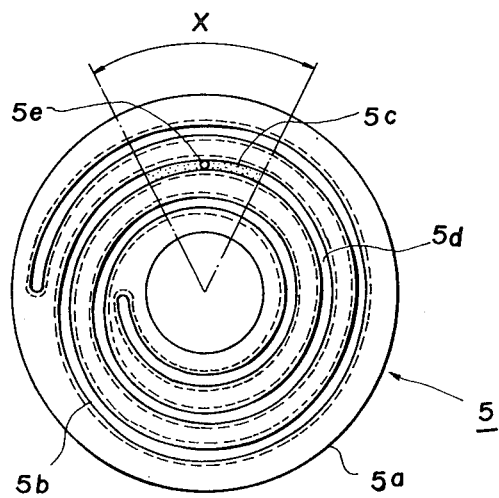
FIG. 6 is a plan view taken on line B—B in FIG. 5.

The rotary base 5a is secured to the lower face side of the aforesaid photoconductor 4b and rotated together with the steering wheel 1 and at the lower face side, a spiral guide slot 5b is formed by a specified number of turns, for example, as shown in FIG. 6. Further, at the bottom of the guide slot 5b, a low resistor 5c (hereinafter simply referred to as a "conductor") and a high resistor 5d are provided. The conductor 5c is fitted to a portion corresponding to a specified rotational angle of the steering wheel 1, for example, only to a portion X in the rotational angle range in FIG. 6 and the other portion is the high resistor 5d. It is quite natural that the installation of the high resistor can be omitted provided that the rotary base 5a is an insulating material with high resistance. A contact needle 5e is kept pressed into the guide slot 5b of the rotary base 5a by a specified spring force and arranged to be positioned at the conductor portion 5c of the guide slot 5b (as shown in FIG. 6 in a normal posture of the steering wheel 1, that is, in the steering wheel status in almost the straight advancing condition of the automobile where the steering wheel is turned neither clockwise nor counter-clockwise), thereby assuring continuity between the rotary base 5a and the conductor 5c. And, the contact needle 5e is kept connected to the rotation discriminating circuit 6 at the next stage. The rotation discriminating circuit 6 substantially comprises a resistance-voltage conversion circuit 6a which converts a change in resistance taking place due to contact between the rotary base 5a and the contact needle 5e to a change in voltage and a gate circuit 6b which controls the serial output signal fed out of the foregoing photocoupler 4 according to the availability of input delivered from the abovesaid resistance-voltage conversion circuit 6a, for example, as shown by the embodiment in FIG. 2. Reference numeral 7 denotes a decoder circuit and works to decode the input signal thereby to actuate a specified load with reception of the signal led out of said rotation discriminating circuit 6 and put a load 8 in action.

Reference numeral 8 denotes a load of various types corresponding to the switches 2. A d-c power supply 9 is provided to supply power to the circuit.

In FIG. 1, upon operating the switch 2 fitted onto the steering wheel 1, e.g., a wiper switch, the action of the switch is converted to an encoding signal by means of the encoder circuit 3 and which provides an input to the light-emitting element 4a of the photocoupler 4. The light-emitting element 4a converts the signal to a specified photosignal and transmits it to the light-receiving element 4c through the photoconductor 4b.

The light-receiving element 4c works to input the signal to the gate circuit 6b of the rotation discriminating circuit 6 and according to the detecting conditions of rotation by the rotary sensor 5 functioning to pick up the turning conditions of the steering wheel 1, in other words, provided that the steering wheel 1 is within a turning angle range X in an ordinary driving condition where an operation turning the steering wheel clockwise or counter-clockwise for changing the running direction of the automobile is not made. Since the conductor 5c of the rotary base 5a is communicating electrically with the contact needle 5e, a transistor of the resistance-voltage conversion circuit 6a of the rotation discriminating circuit 6 is energized to activate the gate circuit 6b, whereby a signal from the light-receiving element 4c, e.g., the wiper driving signal, is input to the decoder circuit 7.

It thus results in the load 8 responding to the operation of the desired switch 2, e.g., a wiper being driven based on the command of the decoder circuit 7.

On the other hand, when the steering wheel 1 is turned clockwise or counter-clockwise to change the running direction of the automobile, the contact needle 5e of the rotary sensor 5 transfers from the conductor 5c to the high resistor 5d owing to the rotation of the rotary base 5a and is in contact with the high resistor. Consequently, there is no continuity between the rotary base 5a and the contact needle 5e, and the transistor of the resistance-voltage conversion circuit 6a of the rotation discriminating circuit 6 is deenergized whereby the gate circuit 6b is put in an inactive condition. Hence, the serial output signal fed out of the light-receiving element 4c is not transmitted to the decoder circuit 7 at the next stage.

Thus, when the steering wheel 1 is turned clockwise or counter-clockwise beyond the specified turning angle range X to change the running direction of the automobile, even if a hand or a part of an arm touches the switch 2 of the steering wheel 1 by accident and the switch is maloperated, the erroneous action of the load 8 can be prevented preferably by the work of the rotary sensor 5 and the rotation discriminating circuit 6.

Figure 7:
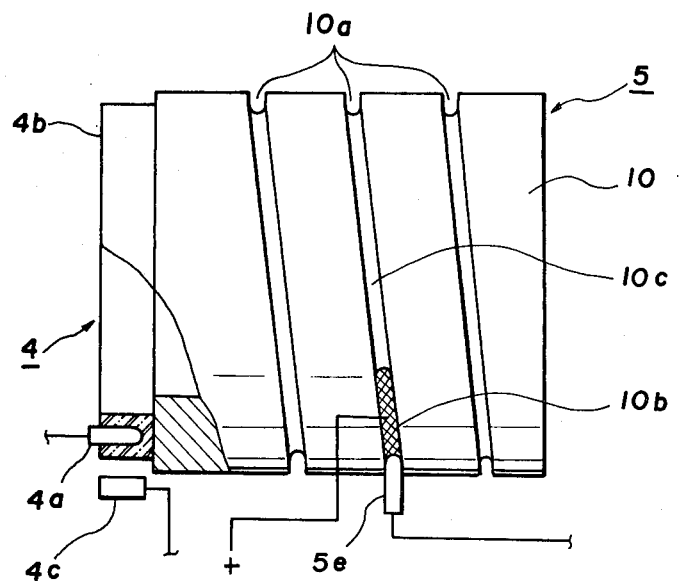
FIG. 7 is a detailed structural drawing showing a third embodiment of the photocoupler and the rotary sensor incorporated in the control device of the present invention for the switches attached to the automobile steering wheel.
Figure 8:
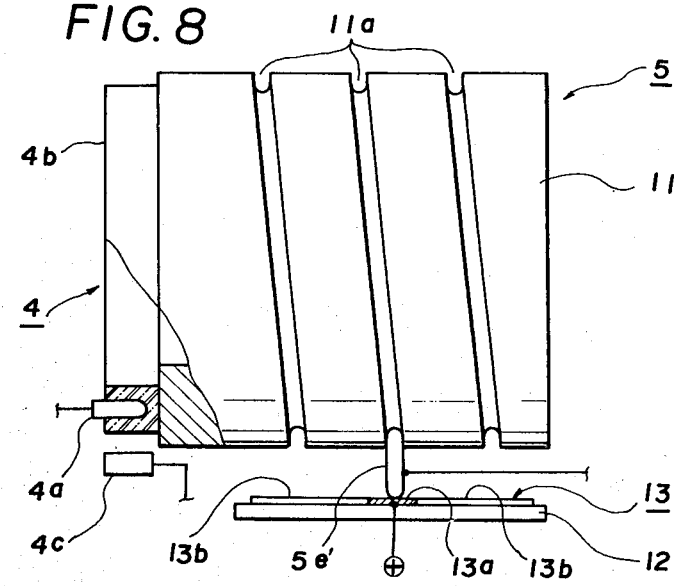
FIG. 8 is a detailed structural drawing showing a fourth embodiment of the photocoupler and the rotary sensor incorporated in the control device of the present invention for the switches attached to the automobile steering wheel.

Referring now to FIG. 7 and FIG. 8, there is given a description of the third and fourth embodiments of the photocoupler and the rotary sensor 5.

In FIG. 7, reference numeral 10 refers to a cylindrical rotary base. In the outer circumference of said rotary base 10, a guide slot 10a is formed spirally by a specified number of turns.

A sliding resistor is fitted in the spiral guide slot 10a. Namely, at the center virtually equidistant from the both ends of the guide slot 10a, a conductor 10b is fitted in a range equivalent to the foregoing turning angle range X shown in FIG. 6 and a positive pole of the power supply is connected to the conductor. The other part is a high resistor 10c.

In this case, too, the installation of the high resistor may of course be cut out as with the aforesaid rotary base 5a if only the rotary base 10 is an insulating material with high resistance. Also, the rotary base 10 is secured unitedly to the lower face of said photocoupler 4 and they are rotated together concentrically with the turning operation of the steering wheel 1.

And, in the condition of the steering wheel where the automobile is running forward almost straight because the steering wheel is turned neither clockwise nor counter-clockwise, the contact needle 5e makes contact with the conductor 10b fitted into the guide slot 10a of the rotary base 10. When the steering wheel 1 is operated clockwise or counter-clockwise, the other way, the contact needle 5e transfers to the high resistor 10c owing to the rotation of the rotary base 10 and the same action as that of the foregoing rotary base 5a is assured thereby comprising the rotary sensor 5.

In FIG. 8, reference numeral 11 denotes a cylindrical rotary body. In the outer circumference of the rotary body 11, a guide slot 11a is formed spirally by a specified number of turns as in the aforesaid rotary base 10. Further, the rotary body 11 is secured unitedly to the lower face of the photocoupler 4 and they are rotated together concentrically with the turning operation of the steering wheel 1. The rotary body 11 allows a contact needle 5e' having one end spring-fitted into the guide slot 11a of the rotary body 11 to transfer in the axial direction of the steering wheel 1 according to the rotating direction by the turning operation of the steering wheel.

A base 12 is fixed at a specified position of the outer circumference of the rotary body 11 and on the surface facing to the rotary body 11, a belt-shaped sliding resistor 13 is fitted with a specified width and a specified length conforming to the axial direction of the steering wheel 1.

Also, at the center nearly equidistant from the both ends of the sliding resistor 13, a conductor 13a moved slidingly is provided in a range of a specified length, i.e., in the sliding range of the slidingly-moved conductor 13a that is equivalent to a distance where the contact needle 5e' transfers when the steering wheel 1 is turned in the turning angle range X in FIG. 6 and a positive pole of the power supply is connected to the conductor 13a. The other part is a high resistor 13b. The contact needle 5e' is spring-connected between the guide slot 11a of the rotary body 11 and the slidingly-moved conductor 13a of the base 12 and retained to enable freely sliding movement only in the axial direction of the steering wheel 1.

Thus, the turning operation of the steering wheel 1 can be detected in the same way as by the foregoing rotary base 5a shown by the second embodiment or the rotary base 10 shown by the third embodiment thereby comprising the aforesaid rotary sensor 5.

The present invention can offer the following advantages with the above-discussed construction and actions. Namely, it can provide a switch control device of an automobile steering wheel which allows easy turning operation of the steering wheel and ensures safer drive of the automobile since there is no possibility of various control switches fitted onto the steering wheel being maloperated even though a hand touches them by accident when changing the running direction of the automobile, i.e., during the turning operation of the steering wheel.

On top of that, the control device can be made at a reasonable cost by virtue of the simplified composition of the parts thereof and so constructed as to enable mounting on the automobile easily, thus promising a wide range of applications to various vehicles.

What is claimed is:

1. In a control device for switches fitted onto a steering wheel for a vehicle having a plurality of control switches attached to a steering wheel, an encoder circuit converting the actions of said switches to respective encoding signals to output a serial output signal, a photocoupler converting the serial output signal of said encoder circuit to a photosignal, and a decoder circuit decoding the photosignal output from said photocoupler to actuate the respective loads, the improvement which comprises a rotary sensor detecting the rotation of the steering wheel and a rotation discriminating circuit controlling the photosignal led out of said photocopier with an input provided from said rotary sensor.

2. A control device for switches fitted onto an automobile steering wheel according to claim 1 wherein the rotation discriminating circuit substantially comprises a resistance-voltage conversion circuit operable to convert a change in resistance to a change in voltage, and a gate circuit controlling a photosignal by the action of said resistance-voltage conversion circuit.

3. In a control device for switches fitted onto an automobile steering wheel including a plurality of control switches attached to a steering wheel, an encoder circuit converting the actions of said switches to respective encoding signals to output a serial output signal, a photocoupler converting the serial output signal of said encoder circuit to a photosignal, and a decoder circuit operable to decode the photosignal output from said photocoupler to actuate respective loads, the improvement which comprises a rotary sensor fitted with a sliding resistor installed nearby a lower portion of the steering wheel and a rotation discriminating circuit controlling the photosignal output of said photocoupler with an input given from said rotary sensor.

4. A switch control device according to claim 3 wherein said rotary sensor substantially comprises a plane rotary base including a sliding resistor fitted into a guide slot formed spirally pivoting the steering wheel shaft at the bottom face of the steering wheel.

5. A switch control device according to claim 4 wherein said rotary sensor substantially comprises a cylindrical rotary base including a sliding resistor fitted into a guide slot formed spirally with the steering wheel shaft in the center at the lower portion of the steering wheel.

6. A switch control device according to claim 3 wherein said rotary sensor substantially comprises a rotary body having a guide slot formed spirally with the steering wheel shaft in the center at the lower portion of the steering wheel, a contact needle moving inside the guide slot of said rotary body and a base secured to the outer circumference of said rotary body and having a sliding resistor made in a belt form to allow said contact needle to make contact therewith.

* * * * *